United States Patent
Besse

(10) Patent No.: US 10,415,322 B2
(45) Date of Patent: Sep. 17, 2019

(54) ASSEMBLY FOR PRODUCING A THREADED JOINT FOR THE DRILLING AND OPERATION OF HYDROCARBON WELLS, AND RESULTING THREADED JOINT

(75) Inventor: Jean-Guillaume Besse, Lille (FR)

(73) Assignee: VALLOUREC OIL AND GAS FRANCE, Aulnoye-Aymeries (FR)

( * ) Notice: Subject to any disclaimer, the term of this patent is extended or adjusted under 35 U.S.C. 154(b) by 303 days.

(21) Appl. No.: 14/342,682

(22) PCT Filed: Sep. 10, 2012

(86) PCT No.: PCT/FR2012/000354
§ 371 (c)(1),
(2), (4) Date: Mar. 13, 2014

(87) PCT Pub. No.: WO2013/038072
PCT Pub. Date: Mar. 21, 2013

(65) Prior Publication Data
US 2014/0203556 A1     Jul. 24, 2014

(30) Foreign Application Priority Data

Sep. 13, 2011 (FR) .................... 11 02769

(51) Int. Cl.
*E21B 17/042* (2006.01)
*F16L 15/00* (2006.01)
*F16L 15/06* (2006.01)

(52) U.S. Cl.
CPC .......... *E21B 17/042* (2013.01); *F16L 15/004* (2013.01); *F16L 15/06* (2013.01); *Y10T 29/49995* (2015.01)

(58) Field of Classification Search
CPC ....... F16L 15/06; F16L 15/002; F16L 15/004; E21B 17/042; Y10T 29/49995
(Continued)

(56) References Cited

U.S. PATENT DOCUMENTS 2,587,544 A    2/1952   Sneddon
3,989,284 A   11/1976   Blose
(Continued)

FOREIGN PATENT DOCUMENTS

CN       101163850 A     4/2008
JP        52-1528        1/1977
(Continued)

OTHER PUBLICATIONS

International Search Report dated Oct. 22, 2012 in PCT/FR12/000354 Filed Sep. 10, 2012.

*Primary Examiner* — Basil S Katcheves
*Assistant Examiner* — Omar F Hijaz
(74) *Attorney, Agent, or Firm* — Oblon, McClelland, Maier & Neustadt, L.L.P.

(57) ABSTRACT

An assembly for production of a threaded connection, including a first and a second tubular component with an axis of revolution and each including at one of its ends at least one first threaded zone produced on an external or internal peripheral surface of the component depending on whether the threaded end is male or female in type, and capable of cooperating together on makeup, the ends finishing in a terminal surface. At least one of the threaded zones has, in longitudinal section passing through the axis, a profile that follows a continuous and concave portion of a curve over at least 10% of the length of engaged threads of the threaded zone.

18 Claims, 5 Drawing Sheets

(58) Field of Classification Search
USPC .................................................. 285/333, 334
See application file for complete search history.

(56) References Cited

U.S. PATENT DOCUMENTS

| | | | |
|---|---|---|---|
| RE30,647 E | 6/1981 | Blose | |
| 4,588,213 A * | 5/1986 | Bollfrass | E21B 17/0423 |
| | | | 277/616 |
| 4,629,224 A | 12/1986 | Landriault | |
| 4,696,490 A | 9/1987 | Church | |
| 4,703,954 A | 11/1987 | Ortloff et al. | |
| 4,943,095 A | 7/1990 | Sugimura | |
| RE34,467 E | 12/1993 | Reeves | |
| 6,050,610 A | 4/2000 | Enderle et al. | |
| 6,581,980 B1 * | 6/2003 | DeLange | E21B 17/042 |
| | | | 285/333 |
| 6,832,789 B2 * | 12/2004 | Church | E21B 17/0423 |
| | | | 285/333 |
| 7,350,830 B1 | 4/2008 | Delange et al. | |
| 7,458,616 B2 | 12/2008 | Reynolds, Jr. | |
| 7,850,211 B2 | 12/2010 | Reynolds, Jr. et al. | |
| 8,186,722 B2 * | 5/2012 | Carcagno | E21B 17/042 |
| | | | 285/333 |
| 2004/0130152 A1 | 7/2004 | Delange et al. | |
| 2006/0108803 A1 * | 5/2006 | Reynolds, Jr. | E21B 17/028 |
| | | | 285/334 |
| 2007/0216160 A1 | 9/2007 | Reynolds, Jr. | |
| 2007/0236014 A1 | 10/2007 | Reynolds, Jr. et al. | |
| 2008/0054633 A1 | 3/2008 | Reynolds | |
| 2011/0203125 A1 * | 8/2011 | Moreau | G01B 3/40 |
| | | | 33/199 R |
| 2012/0049514 A1 | 3/2012 | Granger et al. | |

FOREIGN PATENT DOCUMENTS

| | | |
|---|---|---|
| JP | 60-501224 A | 8/1985 |
| JP | 02-080886 A | 3/1990 |
| JP | 06-331070 A | 11/1994 |
| JP | 07-178619 A | 7/1995 |
| JP | 2007-504420 A | 3/2007 |
| JP | 2012-507016 A | 3/2012 |
| RU | 88054 U1 | 10/2009 |
| RU | 2220272 C1 | 6/2010 |
| RU | 2398153 C1 | 8/2010 |
| WO | WO 2004/072533 | 8/2004 |
| WO | 2007 115183 | 10/2007 |
| WO | 2008 027770 | 3/2008 |
| WO | WO 2010/069491 A1 | 6/2010 |
| WO | 2010 130344 | 11/2010 |

\* cited by examiner

ASSEMBLY FOR PRODUCING A THREADED JOINT FOR THE DRILLING AND OPERATION OF HYDROCARBON WELLS, AND RESULTING THREADED JOINT

The present invention relates to an assembly for producing a threaded connection used for drilling and operating hydrocarbon wells, the assembly comprising a first and a second tubular component one of which is provided with a male type threaded end and the other of which is provided with a female type threaded end, the two ends being capable of cooperating in self-locking makeup. The invention also relates to a threaded connection, also termed a connection, resulting from connecting two tubular components by makeup.

The term "component used for drilling and operating hydrocarbon wells" means any element with a substantially tubular shape intended to be connected to another element of the same type or otherwise to constitute, when completed, either a stem for drilling a hydrocarbon well or a riser for maintenance, such as a work over riser, or a casing string or very thick tubing string used in operating a well. The invention is of particular application to components used in a drill stem, such as drill pipes, heavy weight drill pipes, drill collars and portions for connecting pipes and heavy weight drill pipes known as tool joints.

In known manner, each component used in a drill string generally comprises an end provided with a male threaded zone and an end provided with a female threaded zone each intended to be assembled by makeup with the corresponding end of another component, the assembly defining a connection. During drilling, the string constituted thereby is rotated from the surface of the well; for this reason, the components have to be made up together with a high torque in order to be able to transmit a sufficient rotational torque down the well without breaking out or even without over-torqueing.

For conventional products, the makeup torque is generally reached by interfering cooperation of abutment surfaces provided on each of the components intended to be made up. However, because the extent of the abutment surfaces is a fraction of the thickness of the tubes, a critical plastification threshold for the abutment surfaces is rapidly reached when too high a completion torque is applied.

For this reason, threadings have been improved in order to be able to relieve the abutment surfaces of at least a portion or even all of the forces which they are not capable of accommodating. The aim was achieved using self-locking threadings such as those described in prior art document U.S. Re 30 647 and U.S. Re 34 467. In that type of threading, known as self-locking threads, the threads (also termed teeth) of the male end and the threads (also termed teeth) of the female end have a constant pitch but variable thread widths.

More precisely, the widths of the threads (or teeth) increase progressively for the threads of the male end or respectively female end with increasing distance from the male end, respectively female end. Thus, as the male and female threads (or teeth) are made up, they finish by becoming locked one into the other in a position corresponding to the locking point. More precisely, locking occurs for self-locking threadings when the flanks of the male threads (or teeth) lock against the flanks of the corresponding female threads (or teeth). When the locking position is reached, the male and female threaded zones made up one into the other have a plane of symmetry along which the width at the common mid-height of the male and female teeth located at the end of the male threaded zone corresponds to the width at the common mid-height of the male and female teeth located at the end of the female threaded zone.

For this reason, the makeup torque is accommodated by almost all of the contact surfaces between the flanks, i.e. a total surface area which is very substantially greater than that constituted by the abutment surfaces of the prior art.

However, the need to seal the threaded zones of that type of connection by forcing a contact between the flanks and between the crests and roots of the threads renders the makeup operation complex when a lubricant is used. Before assembling the connections, a lubricating film is applied to the threaded zones of the male end (also known as a pin), the female end (also known as the box), or to both. That lubricant film is normally much thicker than is necessary. Thus, as the connection is assembled, surplus lubricant flows through the threaded zones and is then evacuated in the region of the outer shoulder of the male tubular component or in the region of the inner shoulder of the female tubular component.

Further, the lubricant may be trapped in the threading and generate a counter-pressure which tends to disconnect the threads which are interlocked one in the other. In other words, the lubricant may be trapped under pressure if the radial or axial clearance is sufficiently low, i.e. if it is less than the thickness of the lubricant applied to the threaded zones. This may occur in particular in the case in which the threads are in interfering contact, for example in the region of the crests and roots of the threads and at the flanks. For this reason, an incorrect reading for the completion torque is obtained. Then, once in service with an insufficient completion torque, the connection might no longer be sealed and excess lubricant under pressure could escape.

Improvements have been made in order to overcome those disadvantages. Documents U.S. Pat. Nos. 6,050,610 and 7,350,830 propose introducing a groove onto the threads in order to evacuate the lubricant. However, the presence of grooves weakens the fatigue strength and compromises the seal. Other solutions have been envisaged, such as that proposed in the document US 2007/0216160.

The principle is to create perturbations in the threaded zones so that the contact pressure between the threads is cancelled out over certain portions, in particular to allow the lubricant to move and thus to avoid the problem of overpressure.

However, those configurations are problematic in that inspection of the threaded zones is rendered complex. It is in fact necessary to ensure that the perturbation is to plan or whether there has been a machining problem. In addition, the reduction in the contact pressure in a given zone has to be compensated for by an increase in the contact pressure in a neighbouring zone. The risk of galling then arises.

Document U.S. Pat. No. 7,850,211 proposes a self-locking threading comprising clearances that may be provided both between the crests and roots of the threads and between the flanks, so that the total volume of the clearances is a maximum at the central zone of the threading and decreases in the direction of the ends of the threading. This solution still suffers from the disadvantage of imposing a complex variation of the sides of the threading and thus of rendering machining and inspection operations difficult. Further, the fact that the total clearance volume is a maximum in the region of the central portion of the threading, and that the various clearances are provided at the threads, weakens the connection in that the threads grow narrower and narrower, i.e. self-locking, in that portion.

For this reason, the invention is intended to facilitate the movement of lubricant during makeup without compromising the seal of the connection or its fatigue strength.

More precisely, the invention provides an assembly for the production of a threaded connection, comprising a first and a second tubular component with an axis of revolution and each provided at one of its ends with at least a first threaded zone produced on the external or internal peripheral surface of the component depending on whether the threaded end is male or female in type, and capable of cooperating together on makeup, said ends finishing in a terminal surface, characterized in that at least one of the threaded zones has, in longitudinal section passing through the axis, a profile corresponding to a continuous concave portion of a curve over at least 10% of the length of the engaged threads of said threaded zone.

Optional characteristics of the invention, which may be complementary or substitutional, are defined below.

The concave portion of a curve C may be an arc of a circle or an ellipse such that the smallest thread height is reduced by 10% to 90%.

The first and second tubular components may each comprise a second threaded zone produced on the external or internal peripheral surface of the component depending on whether the threaded end is male or female in type, and capable of cooperating together on makeup.

For each component, the second threaded zone may be disposed in the extension of the first threaded zone.

The first and second tubular components may each comprise a metal/metal sealing surface disposed between the first and second threaded zone, the metal/metal sealing surfaces being capable of cooperating in a sealed interference fit when the first and the second tubular components are made up together.

One of the metal/metal sealing surfaces may be tapered, the other sealing surface then being toroidal.

The toroidal surface may be disposed on the tubular component with a male type end, the radius of the torus being in the range 40 to 80 mm, while the tapered surface is disposed on the tubular component with a female type end with a taper in the range 1 to 6 degrees.

The threaded zone or zones may (each) have a taper generatrix forming an angle with the axis of revolution of the tubular components of more than 0.5 degrees, preferably equal to 5 degrees.

The threaded zone or zones may be self-locking, with the threads comprising, viewed in longitudinal section passing through the axis of revolution of the first and second tubular components, a thread crest, a thread root, a load flank, and a stabbing flank, with the width of the thread crests of each tubular component reducing in the direction of the terminal surface of the tubular component under consideration, while the width of the thread roots increases.

The threads of the male and female tubular components have a dovetail profile.

The profile corresponding to a concave portion of a curve may be applied to the threaded zone furthest from the terminal surface of the tubular component with a male type end.

At least one of the threaded zones has, in longitudinal section passing through the axis, a profile which follows at least two continuous concave portions of curves.

The first and last threads of the threaded zones may be imperfect, in order to provide a clearance between the thread crests and roots.

The clearance between the imperfect thread crests and roots may be in the range 0.1 mm to 1.5 mm.

The second threaded zone may be disposed in a taper axis which is parallel to and not concurrent with the taper axis of the first threaded zone.

The helix of the second threaded zone may be offset with respect to the helix of the first threaded zone by an angle alpha.

The invention also concerns a threaded connection resulting from self-locking assembly of a connection in accordance with the invention.

The invention also concerns a process for producing a tubular component with an axis of revolution, characterized in that a first machining of one of the ends of the tubular component is carried out so as to obtain a profile, in longitudinal section passing through the axis, corresponding to a continuous and concave portion of a curve, before carrying out a second machining in order to obtain a threaded zone in accordance with the invention.

The characteristics and advantages of the invention will be disclosed in more detail in the following description made with reference to the accompanying drawings.

Figure 1:
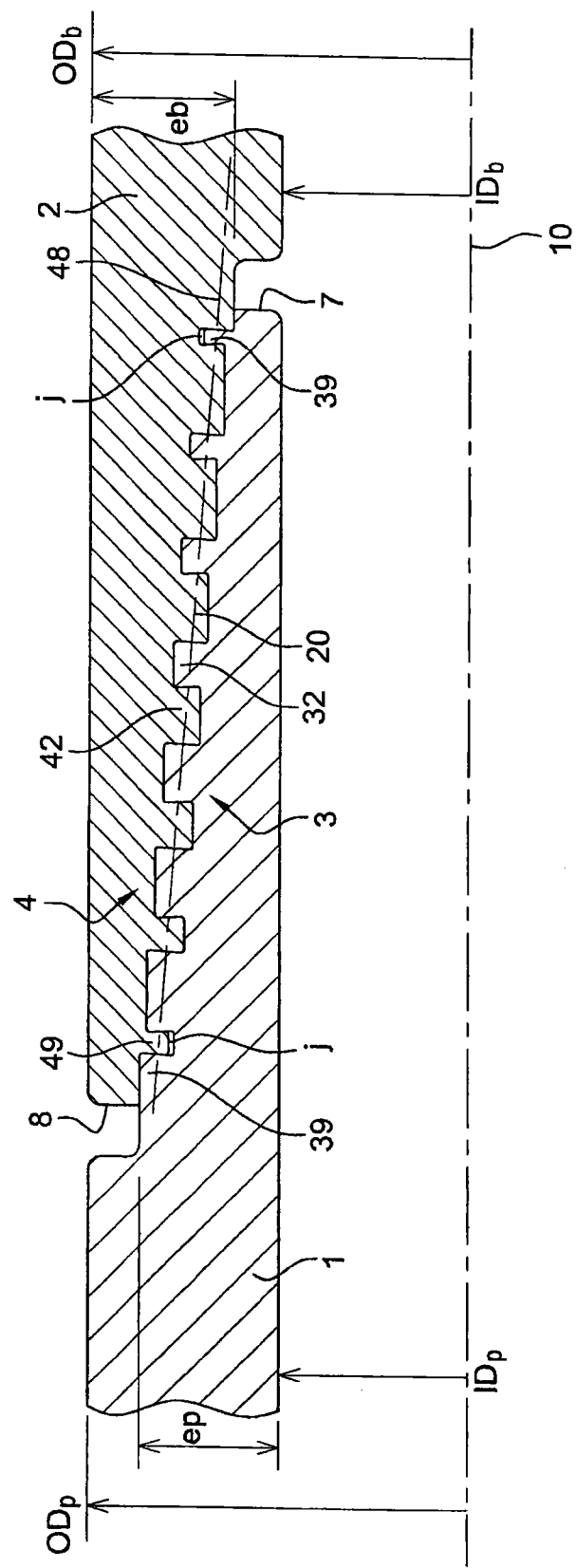
FIG. 1 is a diagrammatic view in longitudinal section of a connection resulting from connecting, by self-locking makeup, two tubular components in accordance with one embodiment of the invention.

FIG. 1 shows a first embodiment of the invention with a threaded connection in the made up state with an axis of revolution 10, comprising a first tubular component with the same axis of revolution 10 and provided with a male end 1 and a second tubular component with the same axis of revolution 10 and provided with a female end 2, the male end and female end being made up together. The two ends 1 and 2 each finish in a terminal surface 7, 8 orientated radially with respect to the axis 10 of the threaded connection and are respectively provided with threaded zones 3 and 4 which cooperate for mutual connection by makeup of the two components. The term "threaded zones" means portions of the circumferential surface of a tubular component having a continuous threading, i.e. no interruption to the helix of the threading.

The threaded zones 3 and 4 are of a known type termed "self-locking" (also said to have a progressive variation of the axial width of the threads and/or the intervals between the threads) such that a progressive axial interference fit occurs during makeup, up to the final locking position.

Figure 2:
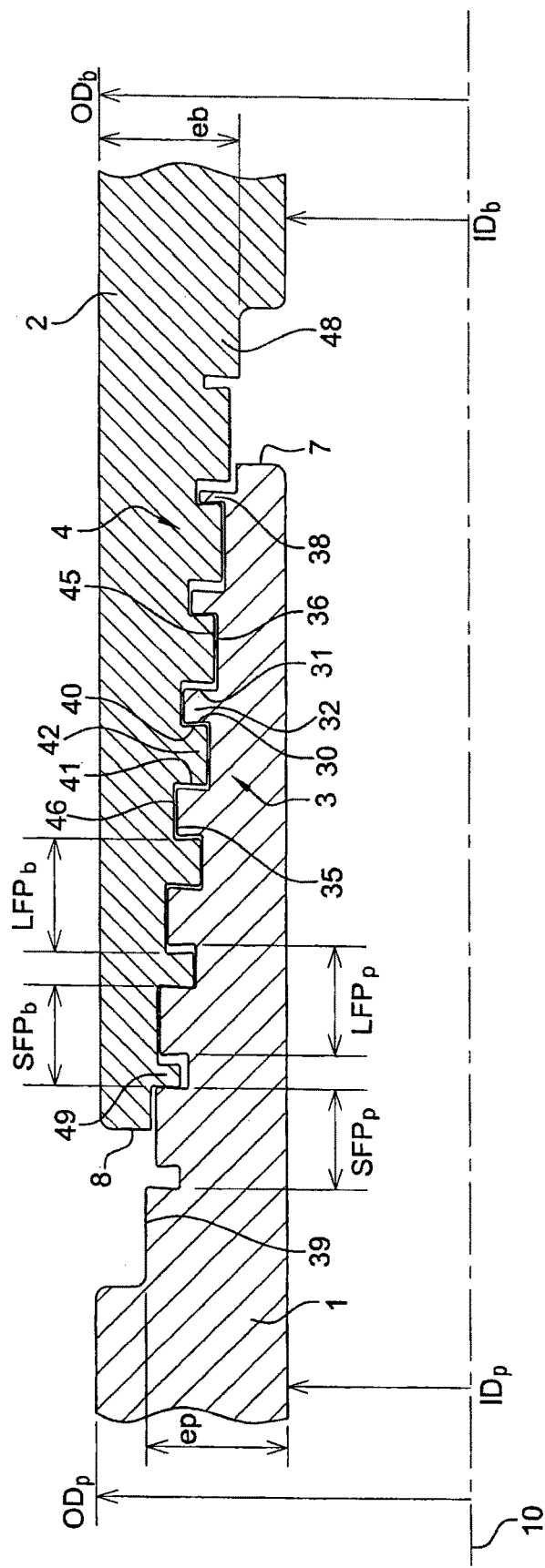
FIG. 2 is a diagrammatic view in longitudinal section of a connection in the course of connecting, by self-locking makeup, two tubular components in accordance with one embodiment of the invention.

FIG. 2 represents the connection of FIG. 1, except that the connection is in the course of being made up. The term "self-locking threaded zones" means threaded zones comprising the characteristics detailed below. The male threads (or teeth) 32, like the female threads (or teeth) 42, have a constant pitch while their width decreases in the direction of their respective terminal surface 7, 8, so that during makeup of the male 32 and female 42 threads (or teeth) finish by locking one into the other in a predetermined position.

More precisely, the pitch LFPb between the load flanks 40 of the female threaded zone 4 is constant, as is the pitch SFPb between the stabbing flanks 41 of the female threaded zone, with the particular feature that the pitch between the load flanks 40 is greater than the pitch between the stabbing flanks 41. Similarly, the pitch SFPp between the male stabbing flanks 31 is constant, as is the pitch LFPp between the male load flanks 30. In addition, the respective pitches SFPp and SFPb between the male 31 and female 41 stabbing flanks are also equal and smaller than the respective pitches LFPp and LFPb between the male 30 and female 40 load flanks, which are themselves also equal.

FIG. 2 also shows the thickness of the male end 1, ep, also termed the critical section of the male end 1, which is not defined by the difference between the external diameter ODp and the internal diameter IDp of said end, but at the base of the threaded zone 3, i.e. at the last thread. Similarly, the thickness of the female end 2, eb, also termed the critical section of the female end 2, is not defined by the difference between the external diameter ODb and the internal diameter IDb, but at the base of the threaded zone 4, i.e. at the last thread. Thus, the critical section of the male end is defined from the thickness of the male end 1, ep, and the critical section of the female end is defined from the thickness of the female end, eb, said critical sections in fact being surfaces when a cross section of the male or female ends is taken at the zones with thickness ep and eb.

The efficiency of the connection is thus defined as being equal to the ratio between the minimum value between the critical section of the male end and the critical section of the female end and the regular section of the tube. Naturally, the regular section of the tube has to link to the thickness of the threaded components measured far from the threaded zones. This thickness is then constant for the male component and for the female component. The thickness is calculated both from the difference between ODb and IDb, and from the difference between ODp and IDp. The notion of connection efficiency is linked to the fatigue strength of the connection.

Figure 3:
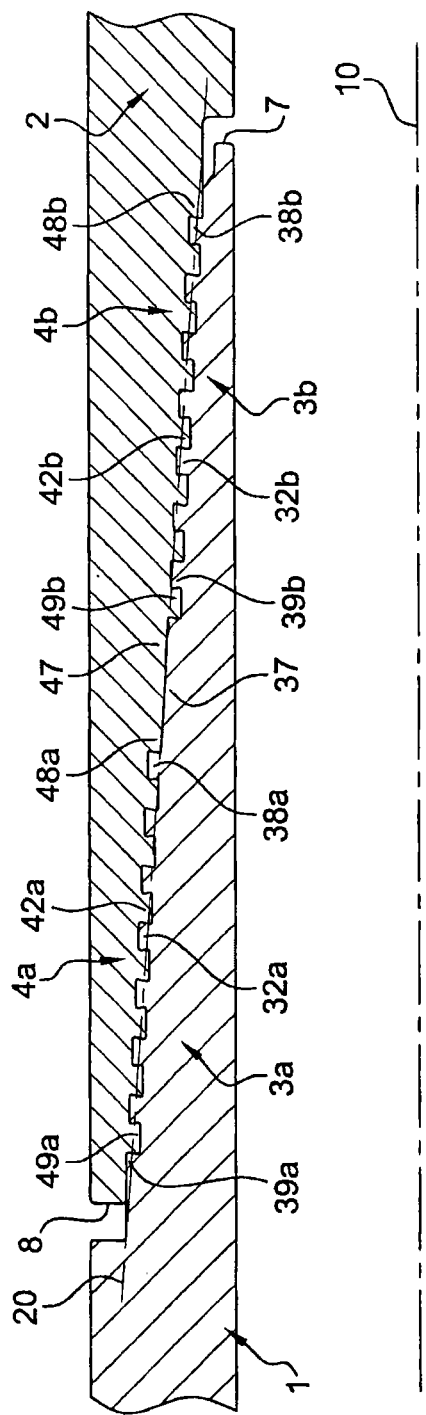
FIG. 3 is a diagrammatic view in longitudinal section of a connection resulting from connecting, by self-locking makeup, two tubular components in accordance with another embodiment of the invention.

FIG. 3 represents a second embodiment of the invention with a threaded connection in the made up condition. The connection comprises an axis of revolution 10, comprising a first tubular component with the same axis of revolution 10 and provided with a male end 1 and a second tubular component with the same axis of revolution 10 and provided with a female end 2, the male end and female end being made up together. The two ends 1 and 2 each finish in a terminal surface 7, 8 orientated radially with respect to the axis 10 of the threaded connection. The first and second tubular components are respectively provided with a first and a second threaded zone 3a, 3b and 4a, 4b which cooperate for mutual connection of the two components by makeup. The threaded zones are also of the known "self-locking" type.

In a first variation, the threaded zones 3a and 3b of the male end are aligned in the same direction 20. In other words, the second tubular threaded zone 3b is disposed in the extension of the first threaded zone 3a. Similarly, the threaded zones 4a and 4b of the female end are aligned in the same direction 20. The first 3b and second 3a threaded zones of the male end are respectively accommodated in a first thread 38b, 38a and a last thread 39b, 39a. Similarly, the first 4a and the second 4b threaded zones of the female end are respectively accommodated in a first thread 49a, 49b and a last thread 48a, 48b.

In another variation, not shown in the Figures, a staged connection may also be envisaged comprising, for each male or female component, two threaded zones which are no longer aligned but are disposed in parallel directions.

Figure 4:
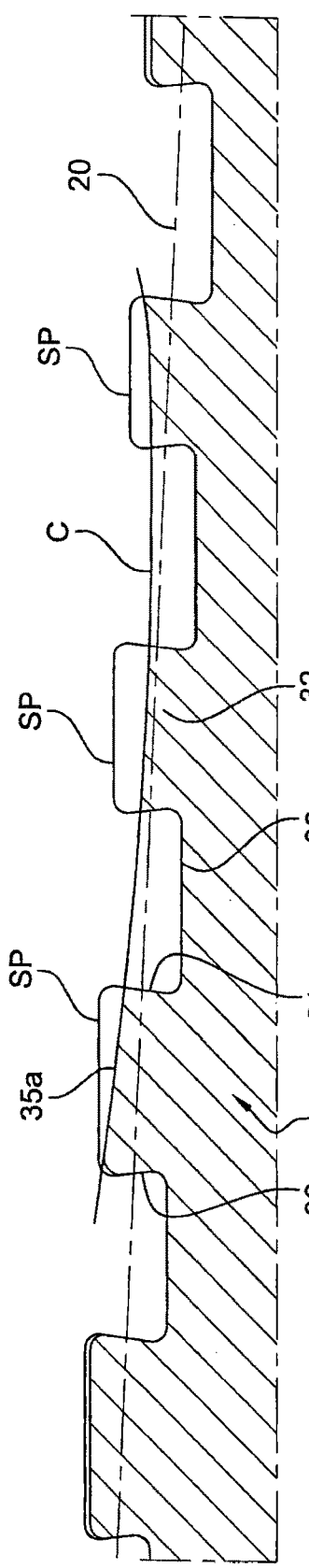
FIGS. 4 and 5 are diagrammatic views of a tubular component in longitudinal section.

FIG. 4 is a detailed view of the male component of FIGS. 1 and 2. In accordance with the invention, at least one of the threaded zones has, in longitudinal section passing through the axis 10, a profile which follows a continuous and concave portion of a curve C over the major portion of the engaged threads in said threaded zone. The term "profile which follows a portion of a curve" means that in longitudinal section passing through the axis 10, the thread crests are each inscribed within a single curve belonging to the plane of the section. In FIG. 4, the threaded zone 3 of the male end has the profile which follows the curve C.

The term "continuous curve" refers to the fact that the curve does not have a point of inflexion. The term "concave curve" refers to the fact that it is orientated such that the profile of the threaded zone is dished. In addition, this profile is applicable over at least 10% of the length of the engaged threads. The term "engaged threads" means the threads which come into contact with the threads of the mating portion, as opposed to threads termed "imperfect", which are located at the ends of the threading and which in practice do not accommodate the makeup forces since they do not come into contact with the threads of the mating portion. In other words, the crests 35a of the threads of the male threaded zone follow a portion of a curve C.

FIG. 4 also shows a profile SP for the threads which is known in the prior art which is clearly different from the eroded profile of the threads which follow the curve C of the invention. It will thus be seen that the dishing produced in the threading by the curve C allows lubricant to move. It will also be seen that the dished profile of the threading does not affect the critical section of the threaded element on which said profile is produced. For this reason, the efficiency of the connection is preserved.

As an alternative, the invention could be applied not to the male threaded zone, but rather to the female threaded zone. Similarly, it would also be possible to provide both the male threaded zone and the female threaded zone with a concave profile.

Figure 5:
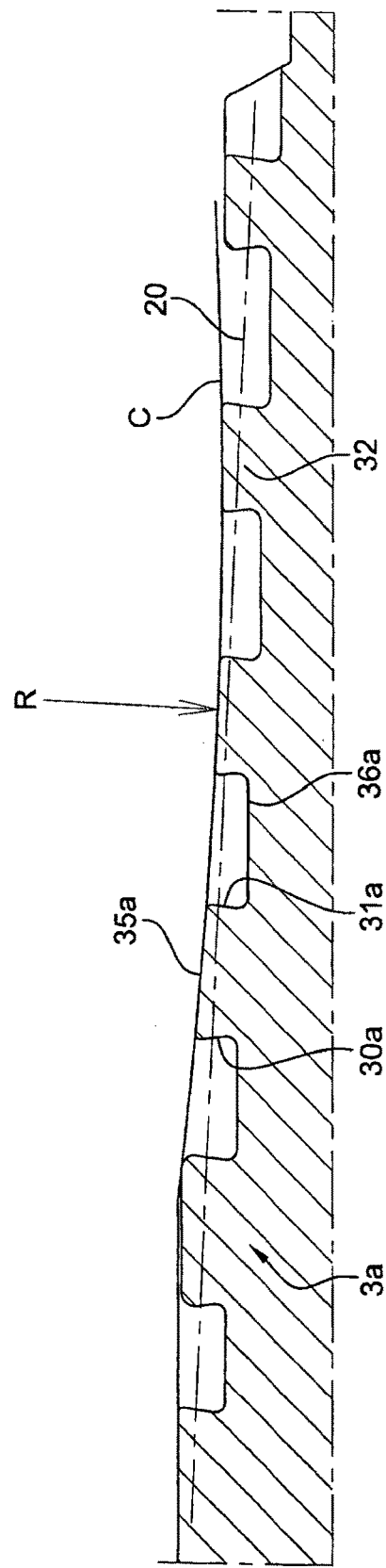

FIG. 5 is a detailed view of the male component of FIG. 3. In accordance with the invention, at least one of the threaded zones has, in longitudinal section passing through the axis 10, a profile corresponding to a continuous and concave portion of a curve C over the major portion of the engaged threads in said threaded zone. As can be seen in FIG. 5, the threaded zone 3a of the male end has the profile which follows the curve C. The fact that the concave curve profile is applied to the second threaded zone 3a of the male component, i.e. that which is furthest from the terminal surface 7 of the tubular component with a male type end 1, is advantageous. In this manner, the pressure of the grease is reduced at the region where the thickness of the male component is the least.

Irrespective of whether the embodiment of FIG. 5, corresponding to a connection provided with two aligned threadings, or the embodiment of FIG. 4, corresponding to a connection provided with a single threading, is considered, several possibilities have been envisaged by the Applicant regarding the profile of the portion of the curve. By way of non-limiting example, the portion of the curve may be a portion of a polynomial curve, of an ellipse or also of a circle.

Preferably, it is advantageous to use an arc of a circle or an ellipse such that the smallest thread height is reduced by 10% to 90%. In other words, the threaded portion is dished over a portion such that the thread height is reduced at most by a value in the range 10% to 90% of the initial thread heights.

As can be seen in FIGS. 1 and 2, and in advantageous manner, the male and female threads (or teeth) have a profile, viewed in longitudinal section passing through the axis of the threaded connection 10, which has the overall appearance of a dovetail so that they are solidly fitted one into the other after makeup.

This supplemental guarantee dispenses with the risk of jump-out, which corresponds to disconnection of the male and female threads when the connection is subjected to large bending or tensile forces. More precisely, the geometry of the dovetail threads increases the radial rigidity of this connection compared with threads generally termed "trapezoidal", the axial width of which reduces from the base to the crest of the threads.

Advantageously and as can be seen in FIG. 2, the threadings 3 and 4 of the tubular components are orientated along a taper generatrix 20 so as to facilitate makeup progress. Generally, this taper generatrix forms an angle with the axis 10 included in a range from 1 degree to 6 degrees. The taper generatrix in the present case is defined as passing through the middle of the load flanks.

Advantageously and as can be seen in FIG. 2, the crests of the teeth and the root of the valleys of the male and female threaded zones are parallel to the axis 10 of the threaded connection. This in fact facilitates machining.

Advantageously, the first and the second tubular components each comprise a metal/metal sealing surface 37, 47 disposed between their first and second threaded zone, the metal/metal sealing surfaces 37 and 47 being capable of cooperating as a sealed interference fit when the first and the second tubular components are made up together.

Preferably, one of the metal/metal sealing surfaces 37, 47 is tapered, while the other is toroidal. The radius of the torus, disposed on the tubular component with a male type end, may be in the range 40 to 80 mm, while the tapered surface is disposed on the tubular component of the female end in a taper in the range 5% to 15%.

Preferably, the thread crests of the female type threaded end interfere with the valleys of the threads of the male threaded end, in the case in which a portion of the profile of the male threaded zone, viewed in longitudinal section passing through the axis 10 of the connection, follows a concave portion of a curve. For this reason, interfering contact is maintained between the crests of the female threads and the valleys of the male threads, while a variable clearance is provided between the male crests and the valleys of the female threads.

Preferably, the first and last threads of the threaded zones are imperfect. The term "imperfect threads" means the threads 38, 39 and 48, 49 located at the ends of the threadings 3 and 4 (in FIG. 2) the height of which has been shaved off, such that a clearance is provided between the thread crests and roots.

In this manner, the pressure of grease after makeup is considerably reduced by the increase in the clearance in the threading, in order to increase sealing performance. Thus, there is little or no counter-pressure which reduces the contact pressure on the sealing and separating surfaces of the male end and the female end. This also means that makeup torques can be hit more accurately since they are not falsified by the counter-pressure exerted by the grease.

Thus, a clearance, j, may be selected between the crests and the roots of the imperfect threads which is in the range 0.1 mm to 3 mm.

Figure 6:
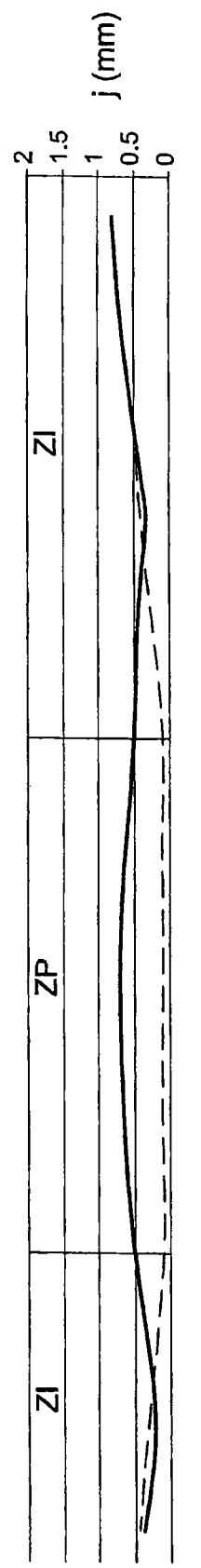
FIG. 6 is a graph comparing the clearances in the threadings of a curve relating to one embodiment of the invention compared with a curve for a conventional connection.

FIG. 6 shows the variations in the clearance all the way along the threading for a connection in accordance with the invention. It will be seen that in the zone of the perfect threads ZP, the clearance increases as the profile in accordance with the curve C hollows out the threaded zone. Either side of the perfect thread zone ZP are the imperfect thread zones ZI. These latter are connected to the zone ZP by a minimum clearance and increase again up to the end of the threaded zone. It will be noted that the clearance in the perfect thread zone ZP is in the range 0.25 to 0.8 mm, while the clearance in the imperfect thread zone ZI is in the range 0.25 to 1 mm.

Figure 8:
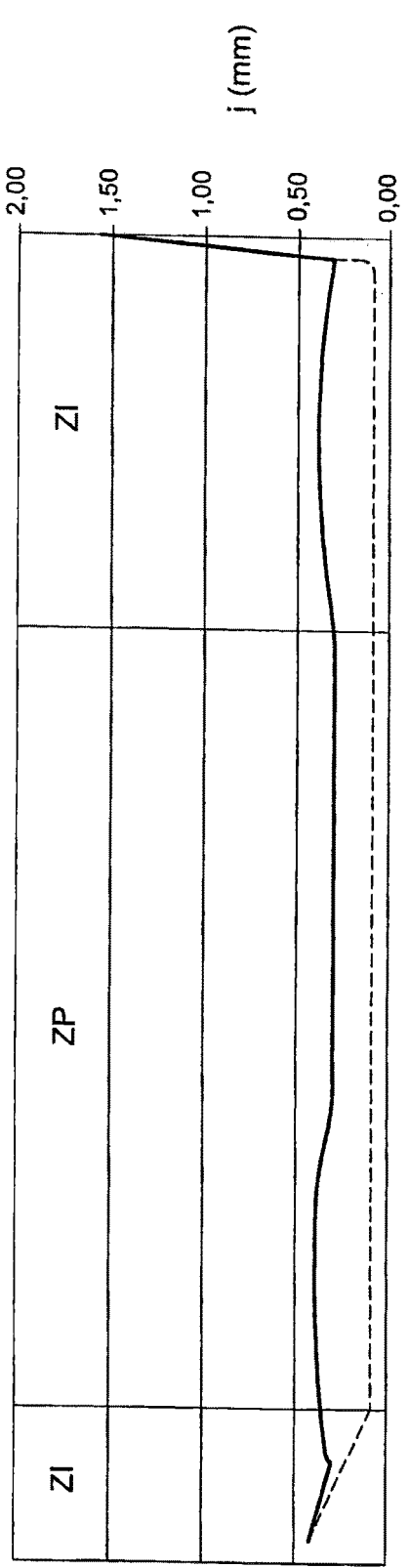
FIG. 8 is another graph comparing the clearances in the threadings of a curve relating to the invention compared with a curve for a conventional connection.

Clearly, the invention also encompasses embodiments which consist of producing two or more concave portions of curves on the same threading. This means that the reduction in the thread height is limited, and thus the threads continue to be in engagement. In other words, movement of grease is provided for along the whole length of the threading with a succession of slimmed portions, whilst still protecting the connection from the risk of thread jump-out. An example is shown in FIG. 8, which shows an embodiment having two slimmed portions. In this case, one of the threaded elements has a threading provided with a thread profile following two concave curves.

Figure 7:
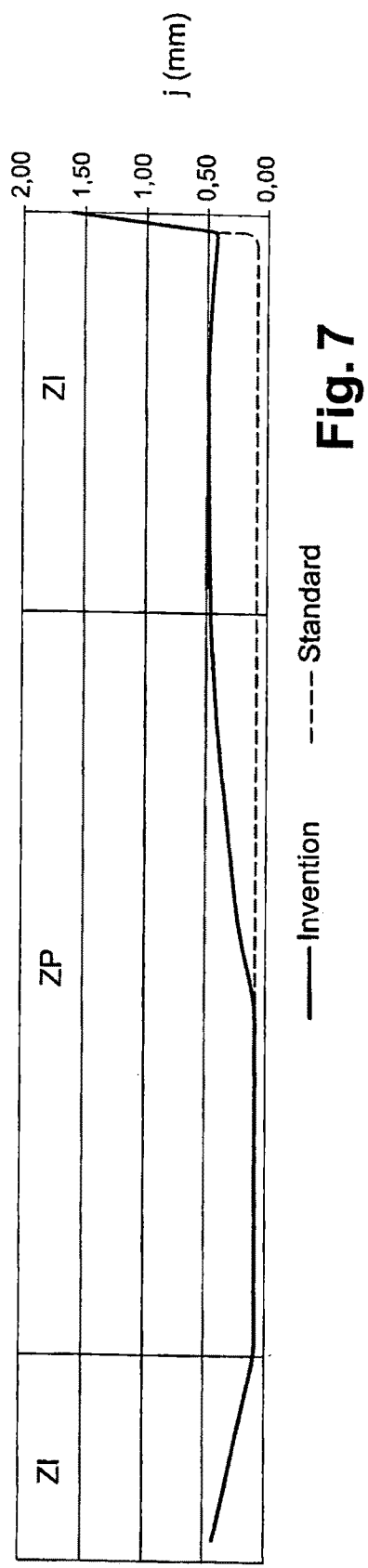
FIG. 7 is another graph comparing the clearances in the threadings of a curve relating to one embodiment of the invention compared with a curve for a conventional connection.

The invention also encompasses various embodiments relating to the positioning of the concave curve on the threading profile. Thus, the curve may be centred in the middle of the threading, and it may be offset towards one end of the threading. FIG. 7 is an example of an embodiment in which the curve is offset and not centred.

Thus, the threaded connection resulting from assembling tubular components of the invention is obtained with a completion torque in accordance with standards which are in force. This type of connection is in particular for use in drilling applications. Advantageously, the male and/or female thread crests may interfere with the valleys of the female and/or male threads. This prevents the lubricant from being trapped; the lubricant is expelled during makeup towards the threading flanks.

Clearly, the invention is applicable to connections comprising two or even more consecutive stepped threaded zones, i.e. with taper axes for the threaded zones which are parallel and non-concurrent.

The invention is also applicable to connections comprising several threading helices, these connections then comprising threadings known as multi-start threadings. In this case, the helix of the second threaded zone is offset with respect to the helix of the first threaded zone by an angle alpha.

Regarding production of such a connection, the invention proposes a method for the manufacture of a tubular component that is applicable to both a component with a male end and to a component with a female end. This process is characterized in that initially, one of the ends of the tubular component is machined in order to obtain a profile, in longitudinal section passing through the axis, corresponding to a continuous concave portion of a curve, and afterwards, machining of the threaded zone is carried out.

This process has the advantage of being simple, in that the first step is effectively to slim down the end of the component, which can be accomplished readily in a lathe operation. The second machining step, which is carried out after the slimming down step, is a conventional step for machining the threaded zone.

The invention claimed is:

1. An assembly for production of a threaded connection, comprising:
    a first tubular component and a second tubular component with an axis of revolution and each including an end that includes at least one first threaded zone produced on an external peripheral surface of a male threaded end or on an internal peripheral surface of a female threaded end, the end of each of the first and second tubular components terminates in a terminal surface, and the first and second tubular components are cooperable to be screwed together, wherein
    the at least one first threaded zone includes threads with thread crests, and
    profiles of the thread crests over at least 10% of a length of the threads in the at least one first threaded zone are configured such that, the profiles of the thread crests follow a same continuously concave portion of a curve extending across the at least 10% length of the threads and belonging to a longitudinal section, and a concave curved surface of each of at least two of the thread crests over the at least 10% length of the threads follows the same continuously concave portion of the curve, when the profiles of the thread crests are viewed in the longitudinal section that comprises the axis of revolution.

2. An assembly for production of a threaded connection according to claim 1, wherein the concave portion of the curve is an arc of a circle or an ellipse such that a smallest thread height is reduced by 10% to 90% from an initial thread height.

3. An assembly for production of a threaded connection according to claim 1, wherein the first and second tubular components each comprise a second threaded zone produced on the external peripheral surface of the male threaded end or on the internal peripheral surface of the female threaded end.

4. An assembly for production of a threaded connection according to claim 3, wherein for each of the first and second tubular components, the second threaded zone is disposed in an extension of the first threaded zone.

5. An assembly for production of a threaded connection according to claim 3, wherein the first and second tubular components each comprise a metal/metal sealing surface disposed between the first and second threaded zones, the metal/metal sealing surfaces configured to cooperate in a sealed interference fit when the first and the second tubular components are made up together.

6. An assembly for production of a threaded connection according to claim 1, wherein the at least one first threaded zone each include a taper generatrix forming an angle with the axis of revolution of the first and second tubular components of more than 0.5 degrees, or equal to 5 degrees.

7. An assembly for production of a threaded connection according to claim 6, wherein the at least one first threaded zone is self-locking, with threads comprising, viewed in the longitudinal section passing through the axis of revolution of the first and second tubular components, a thread crest, a thread root, a load flank, and a stabbing flank, with a width of the thread crests of each of the first and second tubular components reducing in a direction of the terminal surface of the first or second tubular component under consideration, while a width of the thread roots increases.

8. An assembly for production of a threaded connection according to claim 7, wherein the threads of the first and second tubular components, which include male and female tubular components, have a dovetail profile.

9. An assembly for production of a threaded connection according to claim 6, wherein the profile corresponding to the concave portion of the curve is applied to a threaded zone furthest from the terminal surface of one of the first and second tubular components with the male threaded end.

10. An assembly for production of a threaded connection according to claim 1, wherein the at least one first threaded zone includes, in the longitudinal section passing through the axis, a profile which follows at least two continuous concave portions of curves.

11. An assembly for production of a threaded connection according to claim 1, wherein first and last threads of the at least one first threaded zone are imperfect, to provide a clearance between thread crests and roots.

12. An assembly for production of a threaded connection according to claim 11, wherein the clearance between the imperfect thread crests and roots is in a range of 0.1 mm to 3 mm.

13. An assembly for production of a threaded connection according to claim 3, wherein for each of the first and second tubular components, the second threaded zone is disposed on a tapered section which is parallel to and not concurrent with a tapered section of the first threaded zone.

14. A threaded connection resulting from a self-locking connection of the assembly for production of the threaded connection according to claim 4.

15. A process for producing a tubular component with an axis of revolution, the process comprising:
    a first machining of one of ends of the tubular component to obtain a profile, in longitudinal section passing through the axis, corresponding to a continuous and concave portion of a curve, before carrying out a second machining to obtain a threaded zone in accordance with claim 1.

16. An assembly for production of a threaded connection according to claim 1, wherein said at least one first threaded zone is on the external peripheral surface of the male threaded end.

17. An assembly for production of a threaded connection according to claim 1, wherein the profiles of the thread crests in each plane to which the axis of revolution pertains over at least 10% of the length of the threads in the at least one first threaded zone are configured such that, the profiles of the thread crests follow the same continuously concave portion of the curve extending across the at least 10% length of the threads and belonging to the longitudinal section, when the profiles of the thread crests are viewed in the longitudinal section that comprises the axis of revolution.

18. An assembly for production of a threaded connection according to claim 1, wherein a concave curved surface of each of at least three of the thread crests over the at least 10% length of the threads follows the same continuously concave portion of the curve, when the profiles of the thread crests are viewed in the longitudinal section that comprises the axis of revolution.

* * * * *